(12) United States Patent
Lee et al.

(10) Patent No.: US 7,339,505 B2
(45) Date of Patent: *Mar. 4, 2008

(54) IMAGE COMPRESSION AND DECOMPRESSION

(75) Inventors: Jack T. Lee, Bellevue, WA (US); Peter T. Barrett, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/688,758

(22) Filed: Mar. 20, 2007

(65) Prior Publication Data

US 2007/0159375 A1   Jul. 12, 2007

Related U.S. Application Data

(63) Continuation of application No. 11/197,837, filed on Aug. 5, 2005, now Pat. No. 7,230,560.

(51) Int. Cl.
*H03M 7/46* (2006.01)
(52) U.S. Cl. .......................... 341/63; 345/690
(58) Field of Classification Search ................ 341/63; 345/690, 555; 375/240.01
See application file for complete search history.

(56) References Cited

U.S. PATENT DOCUMENTS

| | | | |
|---|---|---|---|
| 7,109,997 B1 * | 9/2006 | Callahan et al. | 345/555 |
| 7,230,560 B2 * | 6/2007 | Lee et al. | 341/163 |
| 2002/0175925 A1 * | 11/2002 | Lie | 345/690 |
| 2006/0126723 A1 * | 6/2006 | Dambrackas | 375/240.01 |

* cited by examiner

*Primary Examiner*—Rexford Barnie
*Assistant Examiner*—Joseph Lauture

(57) ABSTRACT

Techniques employable to compress and decompress images are presented herein.

19 Claims, 9 Drawing Sheets

IMAGE COMPRESSION AND DECOMPRESSION

BACKGROUND

The present application claims priority under 35 U.S.C. §120 as a continuation of U.S. patent application Ser. No. 11/197,837, filed Aug. 5, 2005, the entire disclosure of which is hereby incorporated by reference in its entirety.

BACKGROUND

Users are exposed to ever increasing varieties of content. For example, a user may utilize a set-top box to receive traditional television programming. In addition, the user may use the set-top box to access other types of additional content, such as pay-per-view (PPV) movies, video-on-demand (VOD), electronic-program guides (EPGs), games, email, instant messages, and so on. Additionally, users may utilize a variety of devices to access this content, such as the set-top box as previously described, as well as wireless phones, personal digital assistants, traditional personal computers, and so forth.

The devices utilized to access the content, however, may have differing capabilities. For example, a "fat" device may have significant hardware resources in order to process and display content, such as significant processing, memory and display capabilities. A "thin" device, however, may having limited resources and therefore may be unable to provide the same capabilities as a "fat" device, such as by having limited processing, memory and/or display capabilities. Even though the "thin" device has limited resources, the user may have expectations based on the use of the "fat" device. Therefore, differences between the capabilities of the "thin" devices when compared with the capabilities of the "fat" device may result is user dissatisfaction, even though the "thin" device may be optimized for different uses, such as for mobility, cost, and so forth.

SUMMARY

Image compression and decompression techniques are described. In one or more implementations, techniques are described to compress and decompress an image such that a device having limited resources (i.e., a "thin" client) may output images to provide a user of the device with a richer viewing experience. For example, the images may be compressed such that repeating pixels of the image are encoded using repeating values and non-repeating pixels are encoded using explicit values. The explicit values may be optimized to take advantage of native assembly language calls available on a device that decompresses the image. In another example, transparent pixels of the image are encoded using a "skip pixel" command such that when the compressed image is rendered, the rendering of one or more transparent pixels is skipped.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Image compression and decompression techniques are described. A user may employ a wide variety of devices to view images. However, the capabilities of these devices may differ greatly. For example, a traditional image format that may be readily processed by a feature-rich device (i.e., a "fat" device) may be too complicated for processing by a limited-resource device, i.e., a "thin" device. For instance, processing of the traditional image format by the thin device may require a significant portion of the thin device's resources such that a limited number of images may be processed in a given amount of time, the processing of the image may affect other features provided by the thin device, and so on. Thus, the processing of this traditional image format may result in a diminished user experience.

In one or more implementations, image compression and decompression techniques are described which may employ an image format which may be utilized to provide "rich" images on limited-resource clients. For example, the image format may store a pallet-indexed image using run-length encoding (RLE). The palette may be provided separately from the image, thereby reducing the overall size of the image and conserving the amount of memory and bandwidth resources needed to store and communicate the image.

Additionally, the image may be compressed to take advantage of native assembly language calls of clients which decode the image. For example, non-repeating values of the image may be encoded to take advantage of a "block copy" command to copy pixels representations from the compressed image to a screen buffer without further processing of the pixel representations. Further discussion of the block copy optimization may be found in relation to FIG. 5-7.

Further, the image may be compressed such that the rendering of transparent pixels is "skipped". For instance, one or more transparent pixels may be represented through use of a "skip" command such that these pixels are "skipped over" and not rendered to give the appearance of seeing through to the screen content below it. Further discussion of encoding and decoding of transparent pixels may be found in relation to FIGS. 8 and 9.

In the following discussion, an exemplary environment is first described which may provide image compression and decompression techniques. Exemplary procedures are then described which may be employed in the exemplary environment, as well as in other environments.

Exemplary Environment

Figure 1:
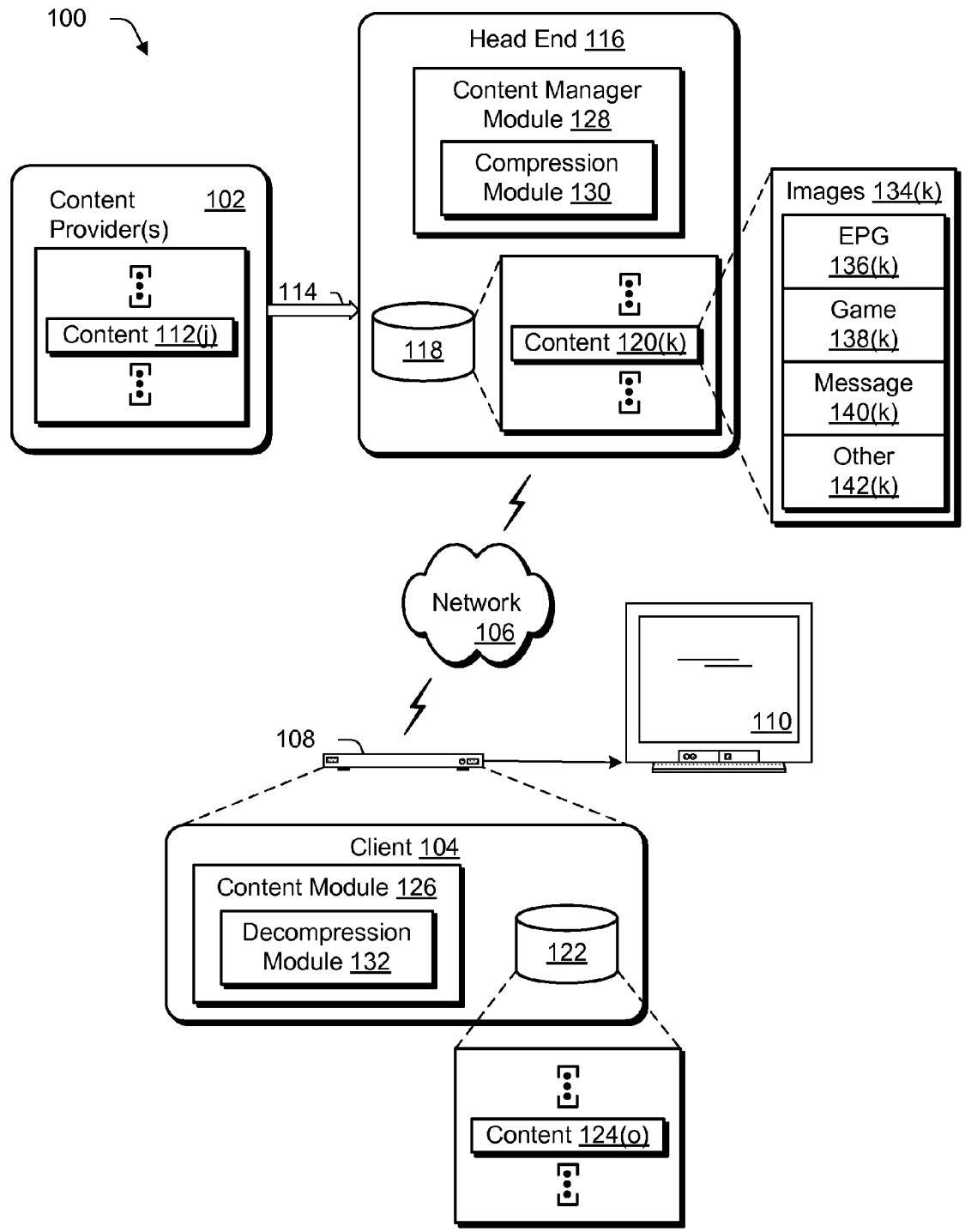
FIG. 1 is an illustration of an environment in an exemplary implementation that may provide image compression and decompression. The illustrated environment includes a head end and a client.

FIG. 1 illustrates an environment 100 in an exemplary implementation that may provide image compression and decompression. The environment is illustrated as including a content provider 102 that is communicatively coupled to a client 104 over a network 106. The client 104 may be configured in a variety of ways. For example, the client 104 may be configured as a computing device that is capable of communicating over the network 106, such as a desktop computer, a mobile station, an entertainment appliance, a set-top box 108 communicatively coupled to a display device 110 as illustrated, a wireless phone, and so forth. The client 104 may range from a full resource device with substantial memory and processor resources (e.g., television enabled personal computers, television recorders equipped with hard disk) to a low-resource device with limited memory and/or processing resources (e.g., traditional set-top boxes). The client 104 may also relate to a person and/or entity that operates the client. In other words, client 104 may describe a logical client that includes a user and/or a machine.

Although one client 104 is illustrated, a plurality of clients may be communicatively coupled to the network 106. Likewise, although one content provider 102 is illustrated, a plurality of content providers may also be included in the environment 100. The network 106 is illustrated as the Internet, and may include a variety of other networks, such as an intranet, a wired or wireless telephone network, a broadcast network which may include a backchannel to provide two-way communication, and so forth.

The content provider 102 includes a plurality of content 112(*j*), where "j" can be any integer from 1 to "J". The content 112(*j*) may include a variety of data, such as streaming content (e.g., television programming and pay-per-view movies), one or more results of remote application processing, and so on. The content 112(*j*) is communicated over a network 114 to a head end 116. The network 114 may be the same as or different from network 106. For example, the network 114 may be configured as a private subnet while the network 106 is configured as the Internet.

Content 112(*j*) communicated from the content provider 102 over the network 114 is received by the head end 116 and stored in a content database 118 as content 120(*k*), where "k" can be any integer from "1" to "K". The content 120(*k*) may be the same as or different from the content 112(*j*) received from the content provider 102. The content 120(*k*), for instance, may include additional data for streaming to the client 104, may be compressed using one or more data compression techniques by the head end 116 as will be described in greater detail below, may be encrypted, and so forth.

The client 104 may be configured in a variety of ways to receive the content 120(*k*) over the network 106. As illustrated, the client 104 may be configured as a set-top box 108 that is communicatively coupled to a display device 110. The client 104 includes hardware and software to transport and decompress content 120(*k*) received from the head end 116 for rendering by the display device 110. Although a display device 110 is shown, a variety of other output devices are also contemplated, such as speakers.

The client 104 may also include digital video recorder (DVR) functionality. For instance, the client 104 may include a database 122 to record the content 120(*k*) received from the network 106. The database 122 may be implemented in a variety of ways, such as a hard disk drive, a removable computer-readable medium (e.g., a writable digital video disc), and so on. Content 124(*o*), where "o" can be any number from one to "O", that is stored in the database 122 of the client 104 may be copies of the content 120(*k*) that was streamed from the head end 116. Additionally, content 124(*o*) may represent content obtained from a variety of other sources, such as from a computer-readable medium (e.g., a digital video disc) that is accessible by the client 104.

The client 104 includes a content module 126 that is executable to control content playback on the client 104, such as through the use of one or more "trick modes". The trick modes may provide non-linear playback of the content 124(*o*) (i.e., time shift the playback of the content 124(*o*)) such as pause, rewind, fast forward, slow motion playback, and the like. In another example, the content module 126 is executable to control output of content received from the head end 116. For example, content module 126 may communicate with a content manager module 128 that is executable at the head end 116 to stream content 120(*k*) over the network 106 to the client 104. A variety of other examples are also contemplated.

Thus, when playback of the content 124(*o*) is requested, the content module 126 may be executed on the client 104 to retrieve the content 124(*o*). The content module 126 may also restore the content 124(*o*) to the original encoded format as received from the content provider 102. For example, when the content 120(*k*) is recorded in the database 122 to form content 124(*o*), the content 120(*k*) may be compressed through use of a compression module 130. In another example, the content 124(*o*) is stored in a compressed format as it was received form the head end 116. Therefore, when the content module 126 retrieves the content 124(*o*), the content 124(*o*) is decompressed for rendering by the display device 110 through execution of a decompression module 132 at the client 104.

A variety of techniques may be utilized to compress content 120(*k*) for communication over the network 106 by the compression module 130 and decompress content received by the client 104 using the decompression module 132. For example, the content 120(*k*) may include a variety of images 134(*k*), such as EPG 136(*k*) images, game 138(*k*) images, message 140(*k*) images, and other 142(*k*) images. These images 134(*k*) may be provided for display in conjunction with other types of content, such as television programming, video-on-demand, movies, and so forth. For example, an image of an EPG 136(*k*) may be displayed in conjunction with a streaming video of a television program, further discussion of which may be found in relation to FIG. 4.

The techniques may be optimized to compress the images 134(*k*) such that the images may be efficiently decompressed by the client 104, even when the client 104 has limited hardware resources. For example, the compression module 130 may compress the images 130(*k*) by encoding repeating pixels in the images 134(*k*) using repeating commands, such as to encode repetitions of a single pixel within a line of an image, repeating lines of an image, and so on. Additionally, the compression module 130 may also encode transparent pixels of the image to reduce processing required to render the transparent pixels. Therefore, the decompression module 132 may decompress the transparent pixels in an optimized manner, further discussion of which may be found in relation to FIGS. 4, 8 and 9. Further, non-repeating pixels may be encoded to be "block copied" from the compressed image for rendering. Thus, the compressed image may take advantage of native assembly commands available on the client 104, further discussion of which may be found in relation to the following figure.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the compression and decompression strategies described below are platform-independent, meaning that the searching strategies may be implemented on a variety of commercial computing platforms having a variety of processors.

Figure 2:
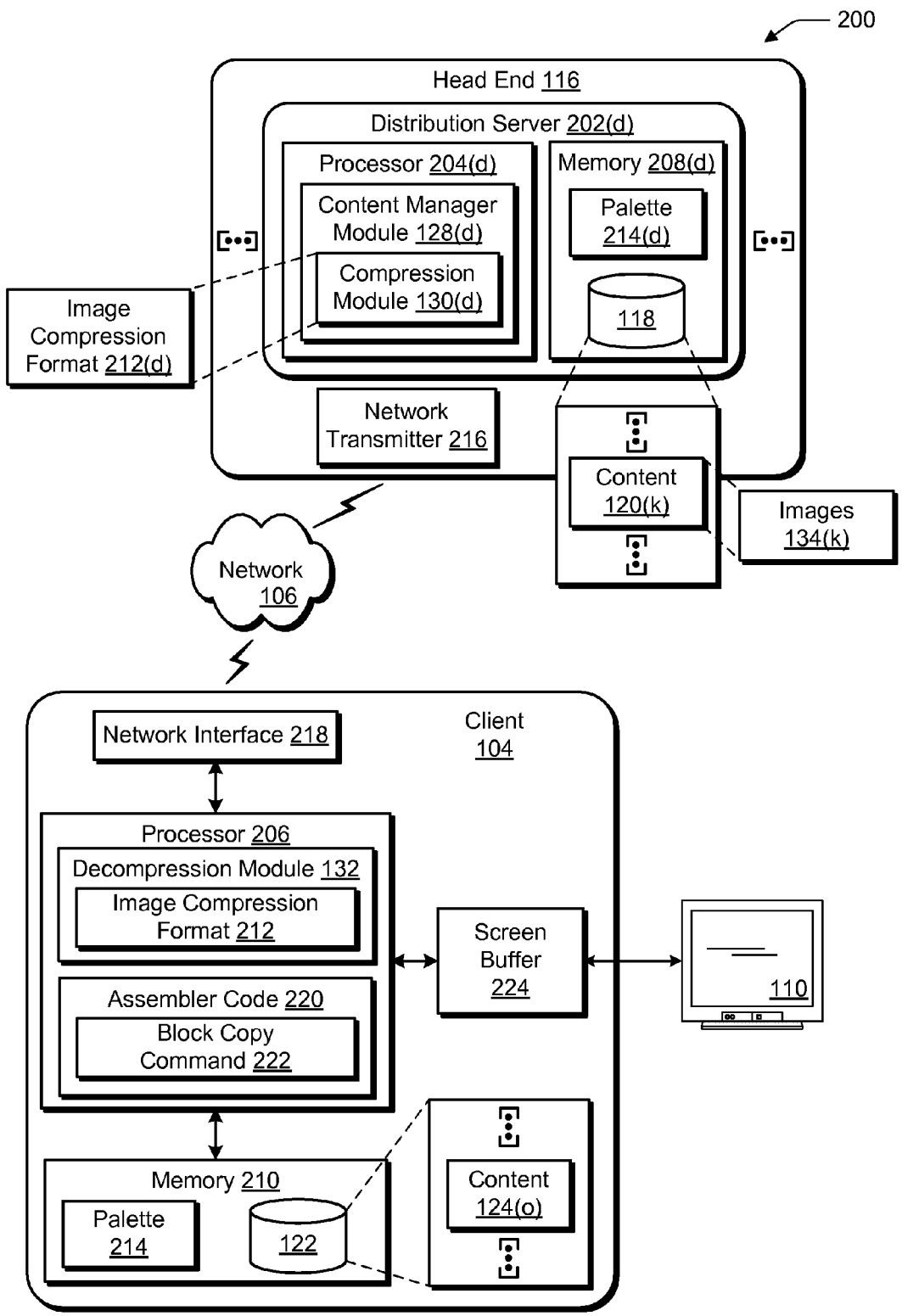
FIG. 2 is an illustration of an exemplary implementation of a system showing the head end and the client of FIG. 1 in greater detail.

FIG. 2 is an illustration of an exemplary implementation of a system 200 showing the head end 116 and the client 104 of FIG. 1 in greater detail. The head end 116 is illustrated as being implemented by a plurality of distribution servers 202(d) (where "d" can be any integer from one to "D") and the client 104 is illustrated as a client device. The distribution servers 202(d) and the client 104 are depicted as having a respective processor 204(d), 206 and a respective memory 208(d), 210.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(d), 210 is shown, respectively, for the distribution server 202(d) and the client 104, a wide variety of types and combinations of memory and computer-readable media may be employed to store computer-executable instructions, such as random access memory (RAM), hard disk memory, removable medium memory, and so forth.

The content manager module 128(d) is illustrated as being executed on the processor 204(d) and is storable in memory 208(d). The content manager module 128(d) is also illustrated as including the compression module 130(d) to depict that the content manager module 128(d) may employ the functionality of the compression module 130(d), although it should be realized that the compression module 130(d) may also be provided as a stand-alone module. The compression module 130(d) is representative of functionality that compresses images 134(k) in the content 120(k) to be communicated over the network 106.

The compression module 130(d), for example, may employ an image compression format 212(d) to compress the images 134(k). The image compression format 212(d) may utilize a palette 214(d) to process the images 134(k) by matching colors of the images 134(k) to colors in the palette 214(d). For instance, the images 134(k) may be processed into an 8-bit palette indexed image using run-length encoding (RLE). In an implementation, the palette 214(d) is not included within the image format to further reduce the size of the image when compressed.

The compression module 130(d), through use of the image compression format 214(d), may then further compress the processed (i.e., color matched) images. For instance, the compression module 130(d) may encode repeating pixels of the image through use of a repeat command, encode transparent pixels through use of a skip command, encode non-repeating values through the use of an explicit command, and so on as further described in relation to the image format illustrated in FIG. 3. The content manager module 128(d) may then provide the compressed image to a network transmitter 216 (hereinafter "transmitter") for communication over the network 106 to the client 104. The transmitter 216 may also distribute other content 120(k) from the database 118, such as television programming, VOD, PPV, and so on.

In alternate implementations, the distribution servers 202(d), database 118, and the transmitter 216 may be implemented as one or more distinct components, locally as part of the head end 116 and/or content provider 102 of FIG. 1, or remotely as part of another distinct system. For instance, although the distribution server 202(d) is shown as including the content manager module 128(d) and compression module 130(d), each component and its corresponding functionality may be implemented via a distinct device, such as one a separate one of the distribution servers 202(d).

The network 106 may support two-way communication between the distribution server 202(d) and the client 104. Additionally, the network 106 can be any type of network, using any type of network topology and any network communication protocol, and can be represented or otherwise implemented as a combination of two or more networks including, for example, microwave, satellite, and/or data networks, such as the Internet. Furthermore, the network 106 may be capable of transmitting and receiving wired or wireless media using any broadcast format or broadcast protocol.

The client 104 is illustrated as including a network interface 218 which is configured to receive content communicated over the network 106 from the head end 116. Additionally, the network interface 218 may be configured to enable the client 104 to communicate with the head end 116 over the network 106, such as to request content 120(k) for streaming as previously described.

The client 104 is further illustrated as executing the decompression module 132 and assembler code 220 on the processor 206, both of which are storable in memory 210. The decompression module 132 is also illustrated as including the image compression format 212 to indicate support by the decompression module 132 of the image compression format 212(d) utilized by the compression module 130(d) of the head end 116.

The assembler code 220 is representative of commands that are native to processor 206 of the client 104 to perform a variety of functions. One such example is a block copy command 222 which may be utilized to block copy pixel representations from a compressed image stored in memory 210 to a screen buffer 224 for output to and rendering by the display device 110.

In an implementation, the block copy command 222 is implemented by a dynamic bandwidth resource allocation (DBRA) command that is native to the assembler code 220 of the processor 206, an example of which may be found in assembler code implemented by a MOTOROLA 68000 microprocessor (MOTOROLA is a trademark of the Motorola Corporation, Schaumberg, Ill.).

The DBRA command, when executed, block copies explicit values of a plurality of pixel representations (e.g., palette-indexed pixel values) from the memory 210 to the screen buffer 224 for output to and rendering by the display device 110. Thus, the DBRA command may be utilized to copy the plurality of pixel representations using a single command, thereby optimizing decompression and rendering of a compressed image.

The decompression module 132 may also further process the compressed image to decompress the image into a form that is renderable by the display device 110. For example, the decompression module 132 may decode repeat commands and skip commands into palette-indexed values that conform to the palette 214 that is illustrated as stored in memory 210 of the client 104. The palette-indexed values may then be converted using the palette 214 into values which are renderable by the display device 110. Thus, the palette 214 used by the client 104 in this example matches the palette 214(d) employed by the head end 116 to encode the image. In this way, the palette 214(d) does not need to be communicated over the network 106 as a part of the compressed image, thereby further reducing the size of the compressed image.

Figure 3:
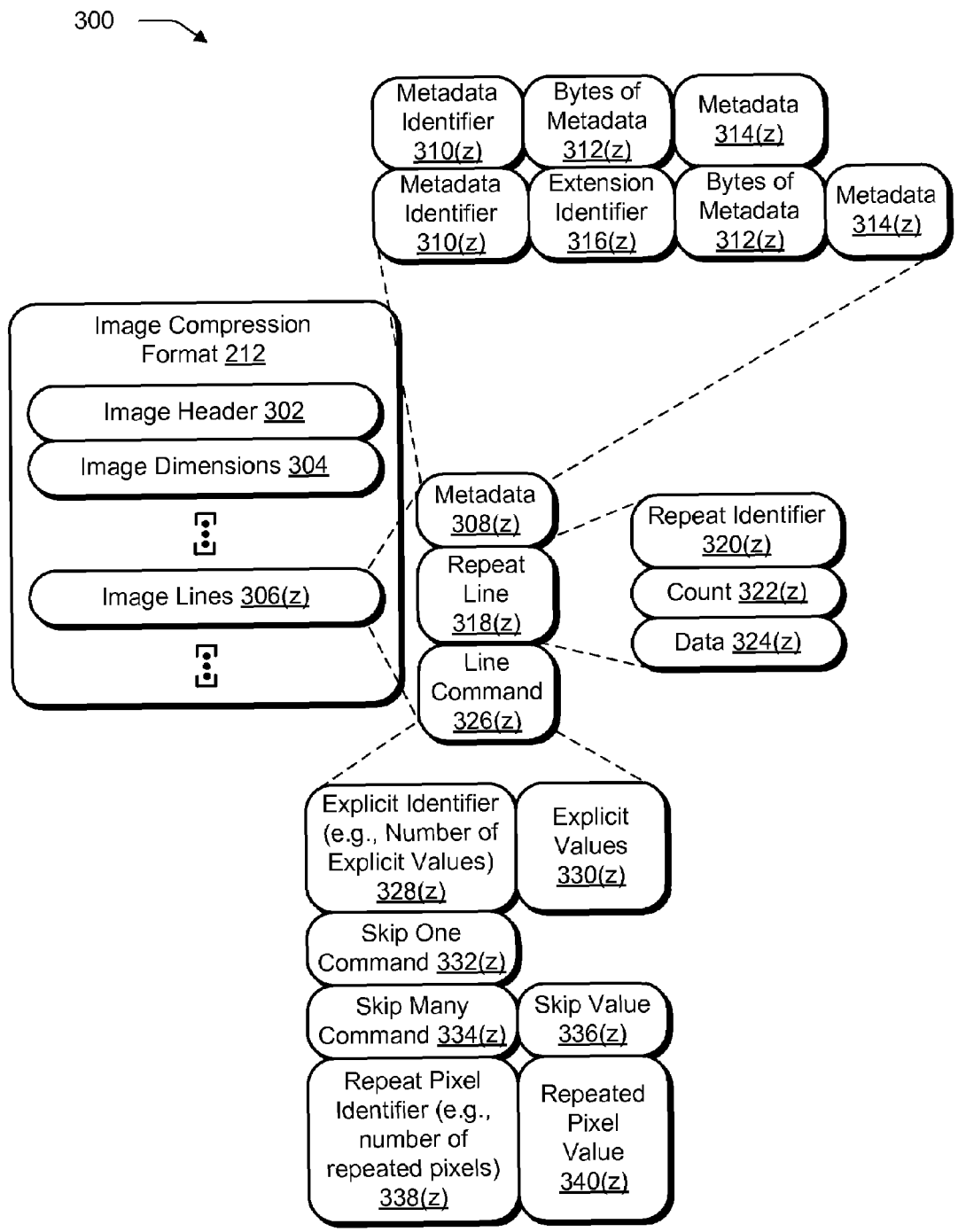
FIG. 3 is an illustration of an exemplary implementation of an image compression format of FIG. 2 that is configured to compress and decompress images.

FIG. 3 illustrates of an exemplary implementation 300 of the image compression format 212 of FIG. 2 that is configured to compress and decompress images. The image compression format 212 includes an image header 302, image dimensions 304 and a plurality of image lines 306(z), where "z" can be any integer from one to "Z". The image header 302 may be implemented using a four byte identifier (e.g., "BLT<space>", where "<space>" may indicate a version number) and followed by the width and height of the image, i.e., the image dimension 304. The rest of the image compression format 212 includes data that represents lines in the image, which may be stored in a "top-down" order such that the first line starting from the top of the image is stored first.

The image lines 306(z) may include a variety of additional information. For example, the image line 306(z) may include metadata 308(z). When metadata is included, the metadata may start with a metadata identifier 310(z), such as a byte command (e.g., value=255) followed by an indication 312(z) of how many bytes are included in the metadata (i.e., a byte that indicates a count of the metadata), which is then followed by the metadata 314(z) itself. If additional bytes are needed to indicate how many bytes of metadata are included in the metadata, an extension identifier 316(z) may be utilized, followed by the indication 312(z) and the metadata 314(z).

The image lines 306(z) may also include a repeat line 318(z) command. The repeat line 318(z) command may include a repeat identifier 320(z) (e.g., byte command value equal to 254) and a one byte repeat count 322(z) where the data 324(z) following the count 322(z) will be repeated for the next specified number of lines. The image compression format 212 is then illustrated in FIG. 3 as being followed by line commands 326(z) and may be terminated with an end of line (EOL) byte, e.g., the byte value is equal to zero.

The line commands 326(z) are a collection of commands that describe palette indices for pixels in a line, and thus may serve as representations for one or more pixels. In the illustrated implementation, the line commands 326(z) may include a byte command which may or may not be followed by data. For example, an explicit identifier 328(z) and explicit values 330(z) may be utilized to encode non-repeating values of the image. The explicit identifier 328(z), for instance, may be implemented using a command value less than a given threshold (e.g., 127), where the value indicates the byte count of the explicit values. The use of this explicit value command enables the block of explicit values 330(z) to be copied using the DBRA assembly code as previously described, which greatly enhances decoding performance.

Transparent pixels in the compressed image may be encoded in a variety of ways. For example, a "skip one" command 332(z) (e.g., byte value equal to 128) allows rendering of the next pixel to be skipped, rather than drawn as 100 percent transparent as was traditionally performed. A "skip many" command 334(z) (e.g., byte value equal to 129) followed by a one-byte skip count indicates that the rendering of the next specified number of pixels is to be skipped, and thus the pixels appear transparent.

Repeating pixels within a line may be encoded use a repeat pixel identifier (e.g., a byte command having of value between 130 and 253) followed by a repeated pixel value 340(z) which indicates that the next 2-125 pixels (i.e., the command value minus 128) contain the same byte value. An image complying with the image compression format 212 of FIG. 3 may be encoded and decoded in a variety of ways, further discussion of which may be found in relation to FIGS. 7-9.

Figure 4:
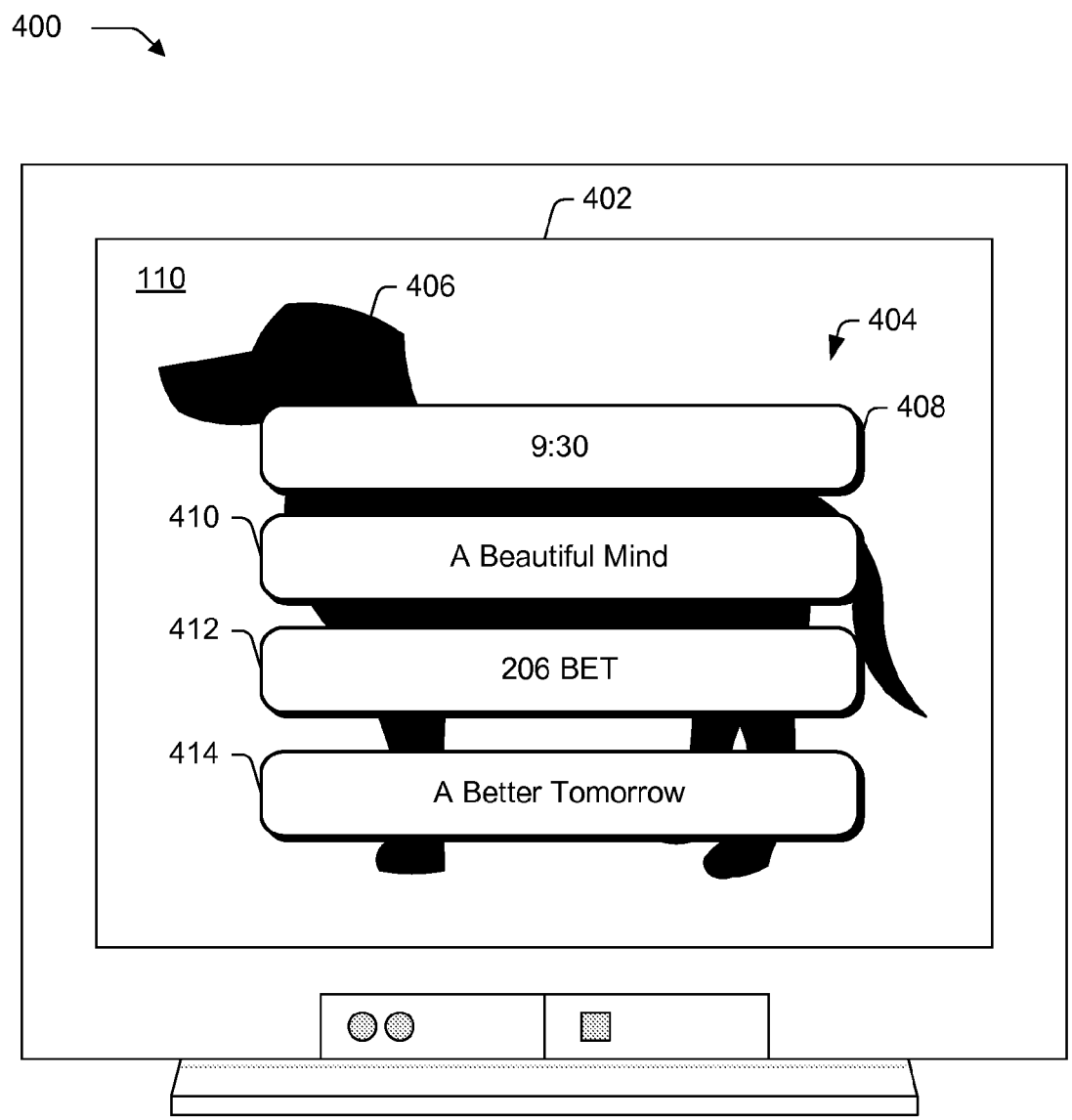
FIG. 4 illustrates an exemplary implementation in which a display device of FIG. 1 displays content in a video layer concurrently with an image in an onscreen display (OSD) layer.

FIG. 4 illustrates an exemplary implementation 400 in which the display device 110 of FIG. 1 displays content in a video layer 402 concurrently with an image in an onscreen display (OSD) layer 404. The video layer 402 is configured to display video, such as television programming, movies, and other types of video content. The video layer 402 is illustrated as displaying a video of a dog 406 in FIG. 4. The OSD layer 404 allows images to be displayed concurrently with the video of the video layer 402, such as an EPG having a plurality of cells 408-414 as illustrated.

In the illustrated implementation 400, the OSD layer 404 is displayed "over" the video layer 402. Therefore, to enable portions of the video layer 402 (e.g., portions of the dog 406) to be displayed, the image displayed in the OSD layer 404 may include transparent pixels to allow a viewer to see through the ODS layer 404 to the video layer 402. As previously described, the pixels may be encoded for transparent display in a variety of ways, such as through use of a "skip" command to skip rendering of the pixel. Therefore, rather that perform a palette look-up to determine that a particular pixel is transparent (as was traditionally performed), the rendering of the pixel may be skipped, thereby conserving processing, memory, and display resources. Further discussion of transparent pixel encoding may be found in relation to FIGS. 7-9.

Exemplary Procedures

The following discussion describes image compression and decompression techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100, system 200 and embodiments 300, 400 of FIGS. 1-4, respectively.

Figure 5:
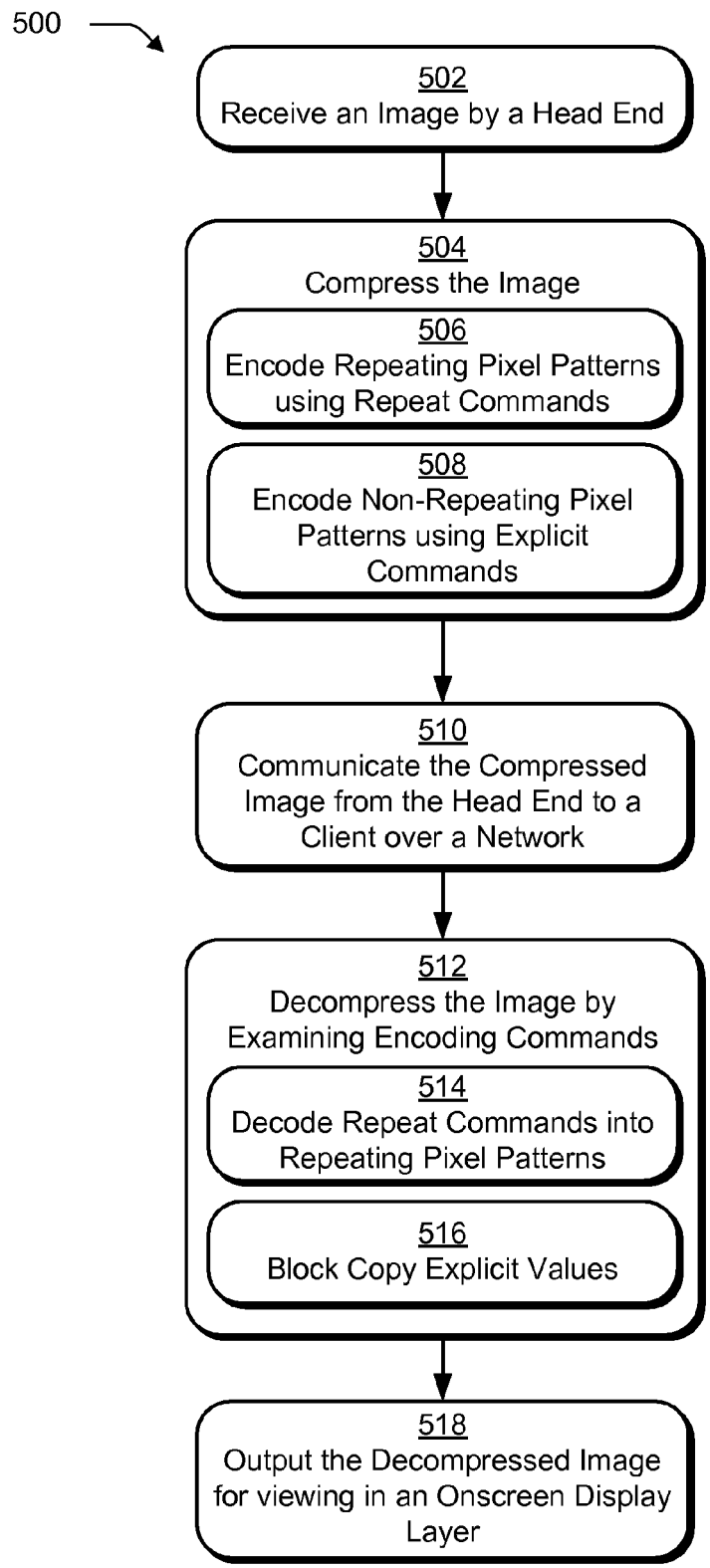
FIG. 5 is a flow diagram depicting a procedure in an exemplary implementation in which an image compressed at a head end is communicated to a client and decompressed for output on a display device.

FIG. 5 depicts a procedure 500 in an exemplary implementation in which an image compressed at a head end is communicated to a client and decompressed for output on a display device. An image is received by a head end (block 502). For example, the image may be received by the head end from a content provider 102, through execution of an application at the head end 116 (e.g., an EPG configured at the head end), and so on.

The received image is then compressed (block 504). For example, repeating pixel patterns may be encoded using repeat commands (block 506), such as a repeat line 318(z) command for repeating lines, repeat pixel line command using a repeat pixel identifier 338(z) and a repeated pixel value 340(z), and so on.

Non-repeating pixel patterns are encoded using explicit commands (block 508). As previously described, an explicit command may include an explicit identifier 328(z) and explicit values 330(z). The explicit identifier 328(z) may be implemented using a command value less than a given threshold (e.g., 127), where the value indicates the byte count of the explicit values. The use of this explicit value command enables the block of explicit values 330(z) to be copied using the DBRA assembly code.

The compressed image is then communicated from the head end to a client over a network (block 510). For example, the compressed image may be configured for display in the OSD layer 404 concurrently with content in the video layer 402. Therefore, the compressed image may be streamed with the content over the network 106 to the client 104.

The image is then decompressed at the client by examining encoding commands in the compressed image (block 512). For example, repeat commands may be decoded into repeating pixel patterns, such as by repeating a number of specified lines, a number of pixels in a line, and so forth. Explicit values are block copied (block 516) into the screen buffer 224. For instance, an explicit identifier may be encountered when decoding the compressed image which indicates a number of explicit values that follow the explicit identifier. The explicit values, which act as indices to the palette 214, are then block copied to the screen buffer 224 using a single command, such as a DBRA command. Thus, a plurality of pixel representations may be copied using a single command.

Once decompression is complete, the decompressed image is output for viewing in the OSD layer (block 518). For example, the EPG having the plurality of cells 408-414 may be displayed in an OSD layer 404 concurrently with video of a dog 406 in a video layer 402. A variety of other images may also be displayed in the OSD layer 404 without departing from the spirit and scope thereof.

Figure 6:
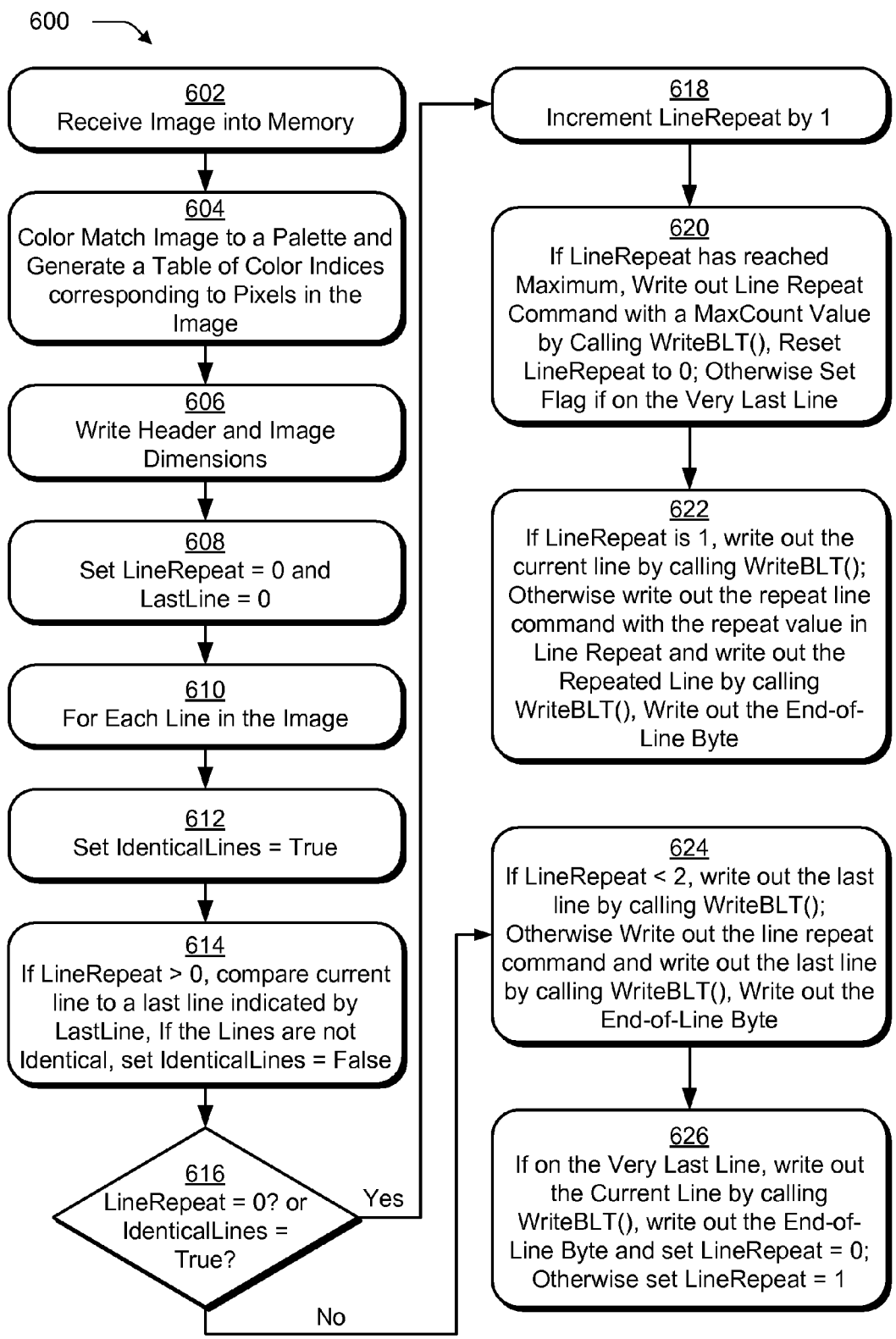
FIG. 6 is a flow diagram depicting a procedure in an exemplary implementation in which an image is encoded using the image compression format of FIG. 3.

FIG. 6 depicts a procedure 600 in an exemplary implementation in which an image is encoded using the image compression format of FIG. 3. An image is received into memory (block 602). For example, the image may be read into memory as a bitmap.

The image is then color matched to a palette and a table of color indices is generated which correspond to pixels in the image (block 604). Each pixel in the image, for instance, may be walked to find the closed match within the palette 214(d).

A header and image dimensions are then written (block 606). For instance, the header may include four bytes which specify the compression format and version of compression format and the image dimensions may be expressed as height and width of the image.

The variables "LineRepeat" and "LastLine" are set to zero (block 608). For each line in the image (block 610), the following blocks of the procedure 600 may be performed. A variable "IdenticalLines" is set to "true" (block 612). A determination is then made as to whether the variable "LineRepeat" is greater than zero, and if so, the current line is compared to a last line indicated by the variable "LastLine". If the lines are not identical, the variable "IdenticalLines" is set as "false" (block 614).

A determination is also made as to whether the variable "LineRepeat" is equal to zero or the variable "IdenticalLines" is equal to "true" (decision block 616). If so ("yes" from decision block 616), blocks 618-622 are performed, and if not ("no" from decision block 616), blocks 624-626 are performed.

For example, when the variable "LineRepeat" is equal to zero or the variable "IdenticalLines" is equal to "true" ("yes" from decision block 616), the variable "LineRepeat" is incremented by one (block 618). If the variable "LineRepeat" has reached its maximum value (e.g., 255), the line repeat command is written out with a count equal to the maximum value by calling a function "WriteBLT( )" and the variable "LineRepeat" is reset to zero, otherwise a flag is set if on the very last line (block 620). Further discussion of the "WriteBLT( )" function may be found in relation to FIG. 7. If the variable "LineRepeat" is equal to one, the current line is written out by calling the function "WriteBLT( )". Otherwise, the repeat line command and the repeat value in the variable "LineRepeat" and the repeated line is written out by calling the function "WriteBLT( )" along with an end-of-line byte (e.g., 0) indicating that the end of the line has been reached (block 622).

When the variable "LineRepeat" is not equal to zero or the variable "IdenticalLines" is not equal to "true" ("yes" from decision block 616), when the variable "LineRepeat" is less than 2, the last line is written output by calling the function "WriteBLT( )", otherwise, the line repeat command is written out by calling the function "WriteBLT( )" along with an end-of-line byte (block 624). If on the very last line, the current line is written out by calling the function "WriteBLT( )" alone with an end-of-line type and the variable "LineRepeat" is set equal to zero. Otherwise, the variable "LineRepeat" is set equal to one (block 626).

Figure 7:
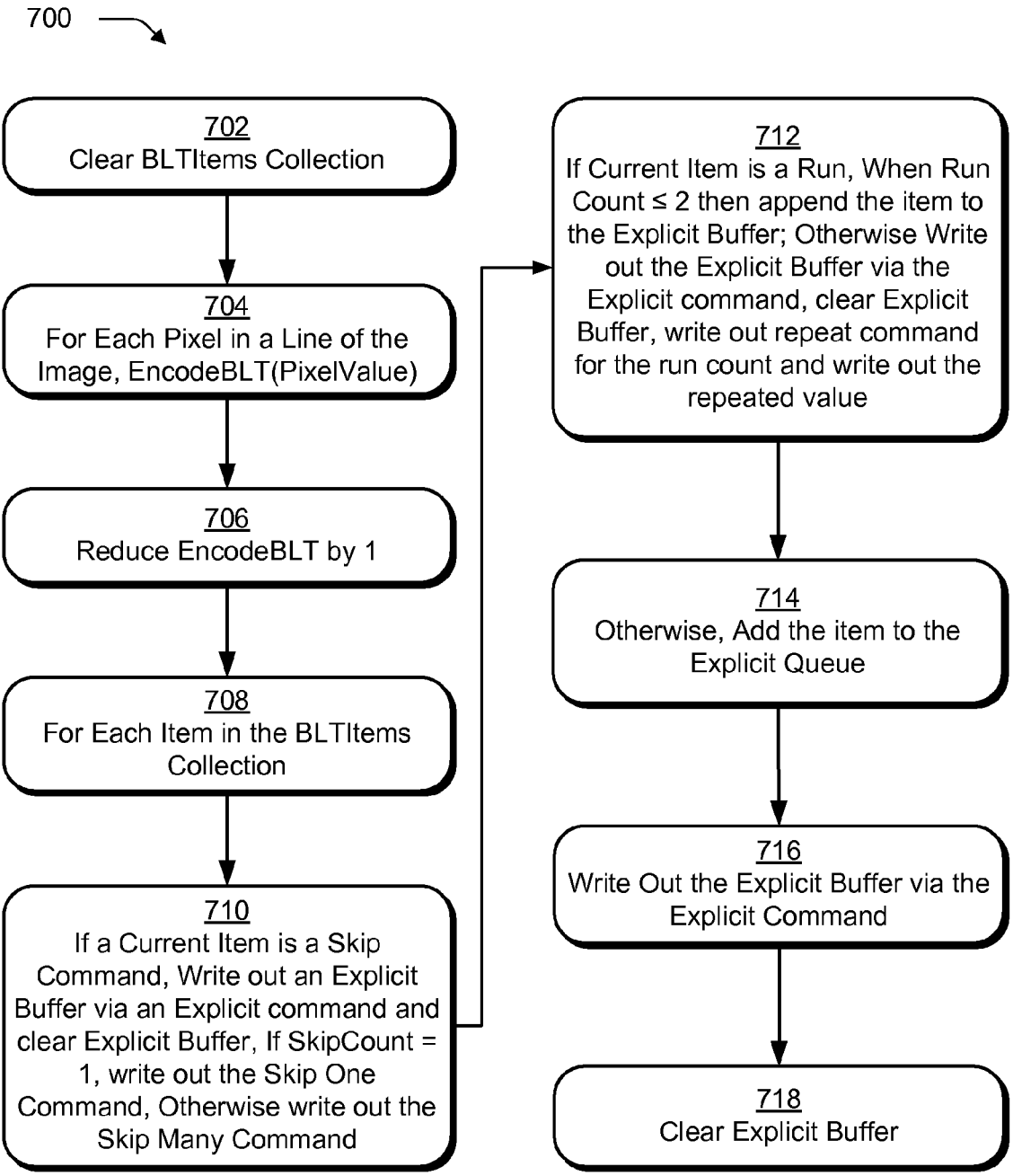
FIG. 7 is a flow diagram depicting a procedure in an exemplary implementation that is callable by the procedure of FIG. 6 to write lines of an image.

FIG. 7 depicts a procedure 700 in an exemplary implementation that is called by the procedure 600 of FIG. 6 to write lines of an image. The procedure 700 corresponds to the function "WRiteBLT( )" previously described in relation to the procedure 600 of FIG. 6 which implements a write-line-command loop that writes commands and values used to encode an image. First, a collection "BLTitems" is cleared (block 702) to remove any previous items (e.g., commands and values) that were stored in the collection, e.g., from a previous iteration of the procedure 700.

Figure 8:
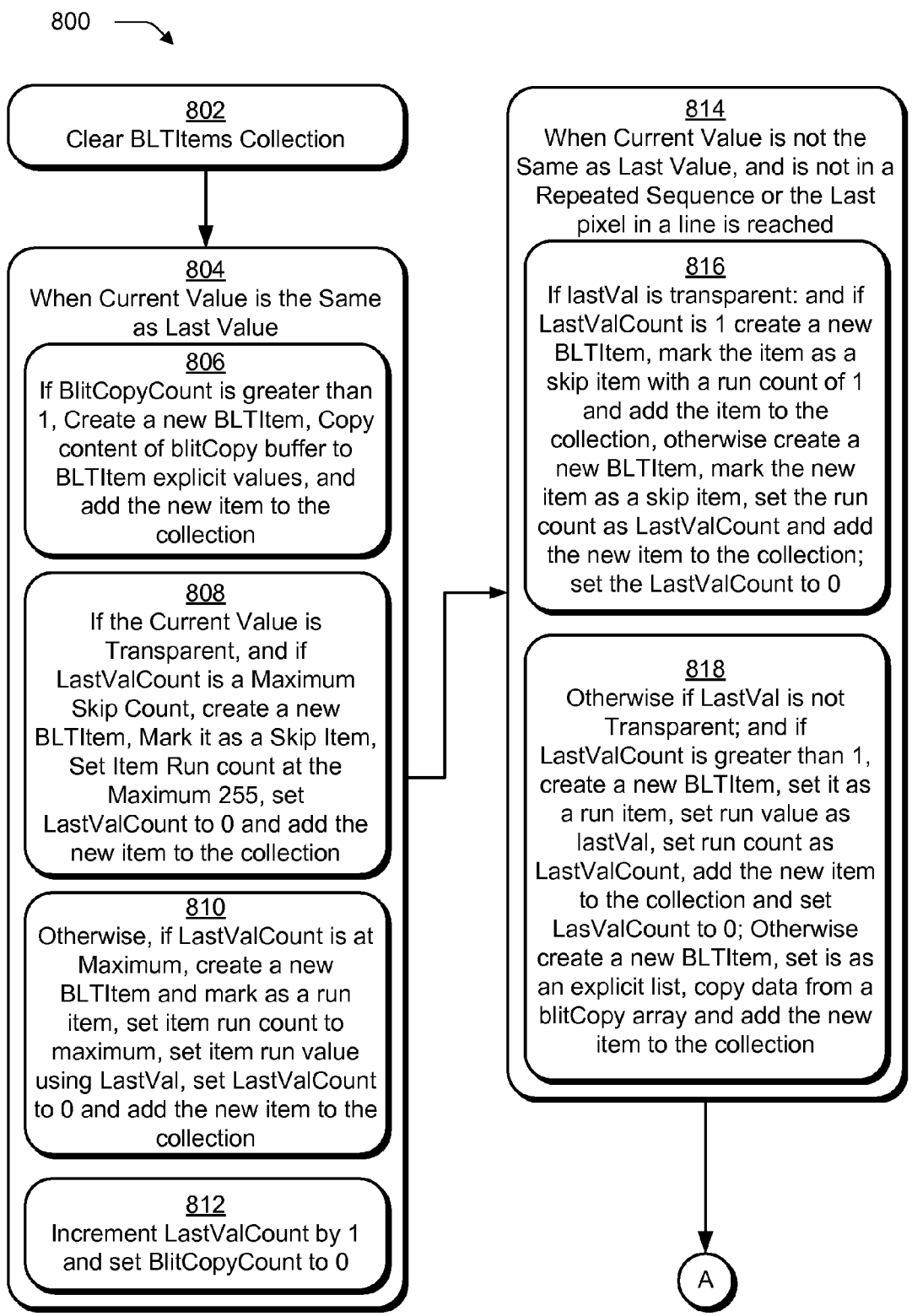
FIGS. 8 and 9 are flow diagrams depicting a procedure in an exemplary implementation that is callable by the procedure of FIG. 7 to construct a collection of items processed by the procedure of FIG. 7.

For each pixel in a line of the image, a function "Encode BLT(PixelValue)" is called to provide a color index value to the pixels, further discussion of which may be found in relation to the procedure 800 of FIG. 8. Once this encoding is performed, a variable "EncodeBLT" is reduced by one (block 706) to tell the function that the lines have been processed and that compression of the lines is desired.

For example, for each item in the "BLTItems" collection (block 708), the following blocks may be performed. When a current item is a "skip" command, an explicit buffer containing explicit values is written out via an explicit command and the explicit buffer is cleared. If the variable "SkipCount" is equal to one, the "skip one" command 332(z) is written out, otherwise the "skip many" command 224(z) is written out with its corresponding skip value 336(z) (block 710).

When a current item is a run, when the run count is less than or equal to two, then the item is appended to the explicit buffer. Otherwise, the explicit buffer is written out via an explicit command, the explicit buffer is cleared, and a repeat command is written for the run count (e.g., the repeat pixel identifier 338(z)) having the repeated value, e.g., the repeated pixel value 340(z).

Otherwise, when the current item is not a "skip" command or a "run", the item is added to the explicit queue (block 714), the explicit buffer is written out via an explicit command (block 716) and the explicit buffer is cleared (block 718). For example, when the explicit buffer has reached a maximum, contents of the explicit buffer are written to the compressed file to be block copied as previously described.

Figure 9:
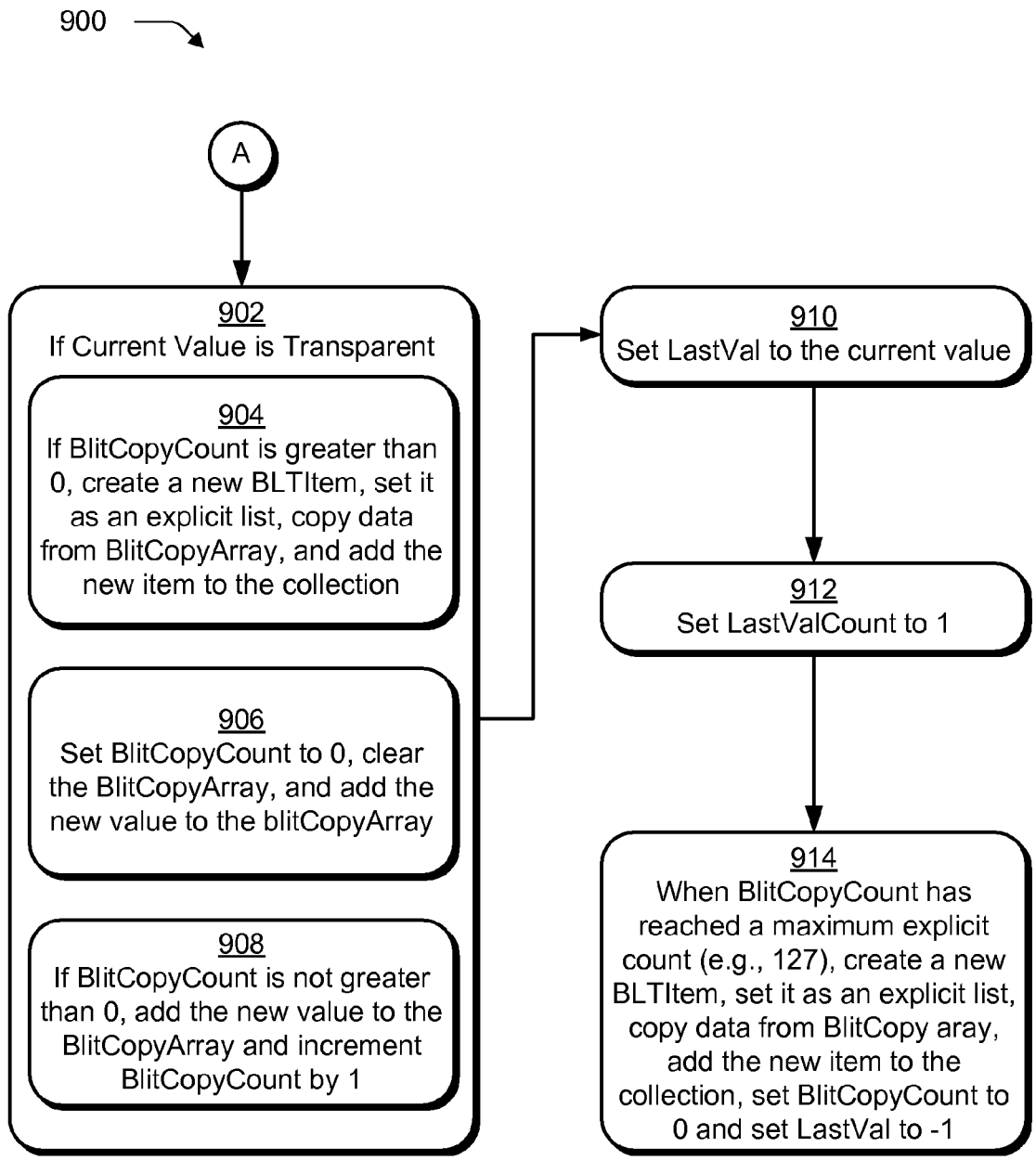

FIGS. 8 and 9 depict a procedure 800, 900 in an exemplary implementation that is callable by the procedure 700 of FIG. 7 to construct a collection of items processed by the procedure 700 of FIG. 7. The procedure 800, 900 corresponds to the function "EncodeBLT( )" previously described in relation to the procedure 700 of FIG. 7 which encodes pixels into items (i.e., BLTItems) for processing. As was previously described in relation to FIG. 7, a collection "BLTitems" is cleared (block 802) to remove any previous items (e.g., commands and values) that were stored in the collection, e.g., from a previous iteration of the procedure 800, 900.

Pixel representations are then processed by the procedure 800, 900. For example, when the current value of a pixel is the same as the last value of a previous pixel (block 804), one or more of the blocks 806-812 may be performed. When a variable "BlitCopyCount" is greater than one, a new BLTItem is created, the content of a "BlitCopy" buffer is copied to BLTItem explicit values, and the new item is added to the collection (block 806). Thus, in this instance an explicit value item is created and added to the collection.

When the current value is transparent and if the variable "LastValCount" has reached a maximum skip count, a new BLTItem is created and marked as a skip item, the item run count is set at the maximum (e.g., 255), the variable "LastValCount" is set to zero and the new item is added to the collection (block 808). Thus, in this instance the maximum number of a skip command has been reached, another item is created and also marked as a skip item, and the original item having the maximum value is added to the collection.

Otherwise, when the variable "BlitCopyCount" is not greater than one and the current value is not transparent, if the variable "LastValCount" is at its maximum, a new BLTItem is created and marked as a run item (i.e., a repeat command), the item run count is set to the maximum (e.g., the repeat pixel identifier 338(z)), the item run value is set using LastVal (e.g., the repeated pixel value 240(z) is set equal to the value of the most recent pixel), the variable "LastValCount" is then set to zero and the new item is added to the collection. After block 806, 808 or 810 has been performed, the variable "LastValCount" is incremented by one and the value "BlitCopyCount" is set to zero (block 812).

When the current value is not the same as the last value, and is not in a repeated sequence or the last pixel in a line is reached (block 814), block 816 or 818 may be performed. If the LastVal is transparent and is LastValCount is 1, a new BLTItem is created and marked as a skip item with a run count of one and added to the collection. Otherwise, a new BLTItem is created and marked as a skip item with a run count set according to LastValCount and added to the collection, after which LastValCount is set to zero (block 816).

Otherwise, if LastVal is not transparent and if LastValCount is greater than one, a new BLTItem is created and set as a run item (e.g., a repeat command) with a run value set according to lastVal and a run count set according to LastValCount. The run item is added to the collection and LastValCount is then set to zero . Otherwise, if LastValCount is not greater than one, a new BLTItem is created and set as an explicit list (i.e., an explicit line command) having explicit values 330(z) copied from a BlitCopy array. The new BLTItem is then added to the collection (block 818).

Reference will now be made to the procedure 900 in relation to FIG. 9. If the current value is transparent (block 902), one or more of blocks 904-908 may be performed. For instance, if the variable "blitCopyCount" is greater than zero, a new BLTItem is created and set as an explicit list, data is copied from the blitCopyArray, and the new item is added to the collection (block 904). The BlitCopyCount is then set to zero, the BlitCopyArray is cleared, and the new valued is added to the BlitCopyArray (block 906). If BlitCopyCount is not greater than 0, the new value is added to the BlitCopyArray and BlitCopyCount is incremented by one (block 908).

The LastVal is then set to the current value (block 910) and the LastValCount is set to one (block 912). Thus in the procedure 800, 900 of FIGS. 8 and 9, a collection of buffers are utilized to collect explicit values until a run (i.e., repeating pixels) or a transparent pixel is encountered. When BlitCopyCount has reached a maximum explicit count (e.g., 127), a new BLTItem is created and set as an explicit list, data is copied form BlitCopyArray, the new item is added to the collection, and BlitCopyCount is set to zero and LastVal is set to minus one (block 914).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising: compressing an image by:
   encoding non-repeating pixels as explicit values that are indexes to a color palette and to be block copied from the compressed image to a screen buffer when the explicit values are rendered;
   encoding repeating pixels using a repeating command; and
   encoding one or more transparent pixels using a skip command that causes rendering of the transparent pixels of the compressed image to be skipped when the compressed image is rendered.

2. A method as described in claim 1, wherein the palette is provided separately from the compressed image.

3. A method as described in claim 1, wherein:
   the repeating pixels are included in a plurality of consecutive lines of the image; and
   the compressing includes encoding the consecutive lines using a single repeat line command.

4. A method as described in claim 1, wherein the compressing includes:
   color matching the image to the palette; and
   generating a table of said indices corresponding to pixels in the image.

5. A method as described in claim 1, wherein the image is included in television content.

6. A method as described in claim 1, wherein the compressing includes writing a header and image dimensions of the image as a part of the compressed image.

7. A method as described in claim 6, wherein;
   when the one or more transparent pixels include a plurality of transparent pixels in succession, encoding the one or more transparent pixels using a skip command that includes a value indicating a number of said successive transparent pixels; and
   otherwise encoding the one or more transparent pixels using a skip command that does not include the value.

8. A method comprising:
   examining encoded commands of a compressed image; and
   when an explicit command is examined which indicates that a plurality of pixel representations are configured to act as an index to a color palette, copying the pixel representations to a screen buffer as a single block.

9. A method as described in claim 8, wherein the explicit value also indicates a number of pixels represented by the plurality of pixel representations.

10. A method as described in claim 8, wherein the image is included in television content.

11. A method as described in claim 8, wherein the color palette is not included within the compressed image.

12. A method as described in claim 8, wherein when a skip command is examined, skipping rendering of a number of pixels indicated by the skip command.

13. A method as described in claim 12, wherein:
   when the skip command includes a value, skipping rendering of a number of pixels indicated by the value; and
   when the skip command does not include a value, skipping rendering of a single pixel.

14. One or more computer-readable media comprising computer executable instructions that, when executed, direct a computer to compress an image by encoding:
   transparent pixels using a skip command that causes rendering of the transparent pixels of the compressed image to be skipped when the compressed image is rendered; and
   non-repeating pixels as explicit values that are configured to be block copied from the compressed image to a screen buffer when the explicit values are rendered.

15. One of more computer-readable media as described in claim 14, wherein the image is configured for display in an onscreen display layer as disposed over a video layer.

16. One of more computer-readable media as described in claim 14, wherein the computer-executable instructions further direct the computer to encode repeating pixels using a repeating command.

17. One of more computer-readable media as described in claim 16, wherein the repeating pixels are included in a single line of the image.

18. One of more computer-readable media as described in claim 16, wherein, wherein:
   the repeating pixels are included in a plurality of consecutive lines of the image; and
   the compressing includes encoding the consecutive lines using a single repeat line command.

19. One of more computer-readable media as described in claim 14, wherein the computer is included at a head end that is configured to communicate television content and the compressed image to a plurality of clients over a network.

* * * * *